United States Patent
Chan et al.

(10) Patent No.: US 7,934,249 B2
(45) Date of Patent: Apr. 26, 2011

(54) SENSITIVITY-ENABLED ACCESS CONTROL MODEL

(75) Inventors: Eric S. Chan, Fremont, CA (US); Ilya Teplov, Foster City, CA (US); Rafiul Ahad, Fremont, CA (US); Mario Bonin, Blainville (CA); David Brennan Gaunce, Los Altos, CA (US); Lenny Karpel, Lyons, CO (US); Patrice Lapierre, Montreal (CA); Terry M. Olkin, Niwot, CO (US); Daniel G. Rabe, Lafayette, CO (US); Ben Self, Boulder, CO (US)

(73) Assignee: Oracle International Corporation, Redwood Shore, CA (US)

( * ) Notice: Subject to any disclaimer, the term of this patent is extended or adjusted under 35 U.S.C. 154(b) by 911 days.

(21) Appl. No.: 11/845,546

(22) Filed: Aug. 27, 2007

(65) Prior Publication Data

US 2009/0064342 A1    Mar. 5, 2009

(51) Int. Cl.
*G06F 21/00* (2006.01)
*G06F 15/16* (2006.01)
(52) U.S. Cl. .................... 726/1; 726/4; 726/28
(58) Field of Classification Search .......... None
See application file for complete search history.

(56) References Cited

U.S. PATENT DOCUMENTS

| | | | |
|---|---|---|---|
| 6,292,798 B1* | 9/2001 | Dockter et al. ............. 1/1 |
| 6,772,350 B1* | 8/2004 | Belani et al. ............ 726/2 |
| 6,941,465 B1* | 9/2005 | Palekar et al. .......... 726/1 |
| 7,209,902 B2* | 4/2007 | Stefik et al. ............ 705/59 |
| 2008/0098485 A1* | 4/2008 | Chiou ................... 726/27 |
| 2009/0164635 A1* | 6/2009 | Denker et al. ....... 709/226 |
| 2009/0171821 A1* | 7/2009 | Denker et al. ........ 705/30 |
| 2009/0177776 A1* | 7/2009 | Denker et al. ....... 709/226 |
| 2009/0249448 A1* | 10/2009 | Choi et al. ............ 726/4 |
| 2009/0313074 A1* | 12/2009 | Harpur et al. ......... 705/9 |
| 2010/0107222 A1* | 4/2010 | Glasser ................. 726/3 |
| 2010/0175112 A1* | 7/2010 | Loeb et al. ........... 726/4 |

* cited by examiner

Primary Examiner — Christopher A Revak
(74) *Attorney, Agent, or Firm* — Park, Vaughan, Fleming & Dowler LLP; Shun Yao

(57) ABSTRACT

Apparatus, methods, and computer program products are disclosed that determine Rights to an entity. The disclosed technology maintains data structures representing a set of entities. These entities include protected-entities and sensitivity-entities. Each of the sensitivity-entities is associated with a respective sensitivity access-control-list. The sensitivity-entities include a first sensitivity-entity that is associated with a first sensitivity-access-control-list. A first protected-entity being one of one or more of the protected-entities associated with the first sensitivity-entity. The technology evaluates Rights to the first protected-entity with respect to the first sensitivity-access-control-list and enables access to the first protected-entity responsive to the Rights evaluation and presents the first protected-entity when access is enabled.

25 Claims, 8 Drawing Sheets

```
Sensitivity =>
   [Description]      : richtext,
   Parent             : Workspace,
   SensitivityOnly    : boolean,
   Mode               : Mode,
   SensitivityACL     : {ACE}
---
Mode ::= Delegateable|ByDelegationOnly|Regular
```

SENSITIVITY-ENABLED ACCESS CONTROL MODEL

BACKGROUND

1. Technical Field

The disclosed technology relates to access control models to determine Rights of an Actor to entities in collaboration-like environments.

2. Background Art

Access control models determine whether an Actor has a Right to Operate on an entity. Some known access control models include the: Discretionary, Role-Based, Mandatory, and Label Security access control models. One skilled in the art will understand, for example, that the "discretionary access control model" is commonly used by collaboration systems and allows fine-grained control of Rights to access or Operate on entities. This control can be defined through an access control policy (ACP) or other set of policy statements. The set of policy statements in an access control policy are often large and difficult to administer. Thus, some access control models support a hierarchical Grouping of {Subjects, Privileges, and Objects} to allow more concise and expressive policy statements. Such a policy statement states that "the Subject has the Privilege to Operate on the Object."

There are a number of well defined ways to access an entity in a collaboration system. These are known as Access Types. An access control enforcement process determines whether a given Subject (user or Actor) has the Right to the desired access of the given entity. Common Access Types include READ, WRITE, DELETE, EXECUTE and DISCOVER Access Types. One skilled in the art will understand that the EXECUTE and DISCOVER Access Types do not necessarily apply to all entities.

Generally there are two ways that each Access Type can be specified with respect to an entity. The common way is to GRANT the Access Type to a Subject. The appearance of this qualifier explicitly allows the Subject to perform the given access. The other way is to DENY the Access Type to a Subject. The appearance of this qualifier explicitly disallows the Subject from performing the given access. When a Subject is listed for the same Access Type with both a GRANT and a DENY to an entity, then the Subject is denied access to that entity. A user is explicitly granted access to perform an operation—there is no default way to obtain access.

Often the nature of a desired Operation does not fit the Access Types described above or there is no target entity to which to attach an access-control-list that represents the Rights needed to operate on or access the target entity. In such situations a Privilege can be used instead of an Access Type. Privileges are granted through Roles and can, for example, include Provisioning types such as EMAIL_USER, CONF_USER, MODIFY_ACL, SECURITY etc. The holder of the Privilege can perform Operations covered by the Privilege. The Privilege is effective so long as the desired Operation is requested in the context of the scope of the Privilege. Example scopes include an Enterprise, an Organization, a Workspace, etc. For example, if the Privilege is scoped at the Enterprise, then any operations covered by the Privilege can be executed anywhere in the Enterprise. However, if the Privilege is scoped to a particular Workspace, then the covered operations can only be performed in that Workspace. Privileges can be overlapping in that one Privilege can encompass the power of another Privilege(s). Privileges are either granted or they are not—there is no notion of denying a Privilege.

To summarize, Rights define the Operations an Actor is allowed to apply to an entity. Rights can include Access Types and Privileges. An Access Type defines the Right provided to an Actor to directly manipulate an entity (for example, to make a copy of or delete an entity), whereas a Privilege defines the Right provided to an Actor to perform an Operation using the entity (for example, the Privilege to use an email system to send an entity).

Using an access control model that supports hierarchical Grouping, one skilled in the art often will use a "Group" to represent a set of Subjects, a "Role" to represent a named set of assigned Privileges, and a "Container" to represent a set of Objects (while the term "object" is commonly used in the literature, in the disclosed embodiment, "Objects" are a subset of entities to which access is controlled by a policy statement). One skilled in the art will understand that a Workspace and a Folder are examples of a Container. Some access control models use Role as a mapping of Subjects to assigned Privileges, and therefore, use Roles to represent a Grouping of Subjects and assigned Privileges. The following is an example access control policy formulated using such an access control model.

WorkGroup: a subject Group which contains a set of Subjects {Greg, Sam, Bill}.

DevelopmentRole: a named set of Privileges {read, write, delete, discover}.

Workspace: a Container of Objects {Calendar, TaskList, Forum}.

The access control policy statement (WorkGroup, DevelopmentRole, Workspace) is a concise statement that contains the tuples from the cross product of the three sets ({Greg, Sam. Bill}×{read, write, delete, discover}×{Calendar, TaskList, Forum}). There are 36 (3×4×3) policy statements defined by this access control policy statement.

Any of the Subjects can Operate on Objects in more than one Container; Privilege can be assigned through more than one Role; and an Object can also belong in more than one Container. Thus, the access authorization model must evaluate the policy statements resulting from multiple {Groups, Roles, and Containers}. Thus the number of policy statements can grow geometrically based on the size of the sets. It is very difficult to administer such a model and the requirement that the access authorization model must evaluate every policy statement makes such an approach inefficient. Such flexibility in defining such an access control policy statement, while conceptually extremely useful for many applications, comes at a very high cost due to the resulting inefficacy and administrative burden. It would be advantageous to provide a less burdensome approach to access control.

Some database systems that incorporate the discretionary access control model attempt to improve this situation by requiring that the policy statements only be defined at the table level. In order to support fine-grained access control over individual rows of the table, these implementations adopt "label security" where each row of a table can be assigned a label (usually in a "label-column" in the table). Thus for example, a user can be assigned Rights to perform a certain set of Operations only on all rows in the table that have a specific label.

One useful application of an efficient discretionary access control model would be in e-mail and/or calendaring systems. Such systems would benefit from having a discretionary access control model that would allow the sender of a message to explicitly control what the recipient of the message can do with it once it is received.

Microsoft Corporation's Outlook™ application allows the sender to mark an email message or calendar invitation with a Sensitivity level (for example, Normal, Personal, Private, or Confidential). Outlook uses this sensitivity as an advisory marking only. For example, Outlook will display an advisory message "Please treat this as Private" in its InfoBar but does not enforce what the recipients do to the message. Thus, the recipient can forward the message marked as private or confidential to any other user, print it, or make copies of it. In Outlook, access control is enforced only if the user applies access-control-lists on the message or folder.

Another approach to sensitivity in the context of calendaring systems is provided by the iCalendar (RFC 2445). This RFC supports a "CLASS" property name that defines the access classification for a calendar component. In section 4.8.1.3, ICalendar specifies the usage of CLASS as follows:

"An access classification is only one component of the general security system within a calendar application. It provides a method of capturing the scope of the access the calendar owner intends for information within an individual calendar entry. The access classification of an individual iCalendar component is useful when measured along with the other security components of a calendar system (e.g., calendar user authentication, authorization, access rights, access role, etc.). Hence, the semantics of the individual access classifications cannot be completely defined by this memo alone. Additionally, due to the 'blind' nature of most exchange processes using this memo, these access classifications cannot serve as an enforcement statement for a system receiving an iCalendar object. Rather, they provide a method for capturing the intention of the calendar owner for the access to the calendar component."

The above approach emphasizes protocol and trust relations among the distributed systems because the "access classifications cannot serve as an enforcement statement." Thus, the above approach does not, for example, offer a means for a delegated-by user to define what Operations a delegated-to user can perform on a calendar entry. It would be advantageous to provide such a capability.

Delegation is the act of a delegated-by user allowing a delegated-to user to perform operations on an entity as if the delegated-to user were the delegated-by user. However, the delegated-by user needs to be able to specify a subset of the delegated-by user's Rights to the delegated-to user. An example of one approach is described by (Nagaratnam, N. and Lea, D. 1998. Secure delegation for distributed object environments. In Proceedings of the 4th Conference on USENIX Conference on Object-Oriented Technologies and Systems (Coots)—Volume 4 (Santa Fe, N. Mex. Apr. 27-30, 1998). USENIX Association, Berkeley, Calif., 8-8). This approach supports simple (impersonation) and cascaded (chained) delegation. It uses a Delegation Certificate to specify the delegator, delegated role, constraints on delegation, a nonce, a validity period, and a delegation server to query for delegation revocation. A role certificate, which can contain a set of Privileges, is used to delegate the associated Role. This approach employs two types of the delegation certificate, namely SimpleDelegationCert or CascadedDelegationCert and emphasizes delegation protocols and establishing trusts among servers in the distributed environments.

Thus, the above approach does not, for example, offer a means for a delegated-by user to define what Operations a delegated-to user can perform on a calendar entry. It would be advantageous to provide such a capability.

It would be advantageous to develop a technology that addresses the previously discussed issues.

BRIEF DESCRIPTION OF THE FIGURES

FIG. 5 illustrates sensitivity-entity data structure;

DETAILED DESCRIPTION

Figure 1:
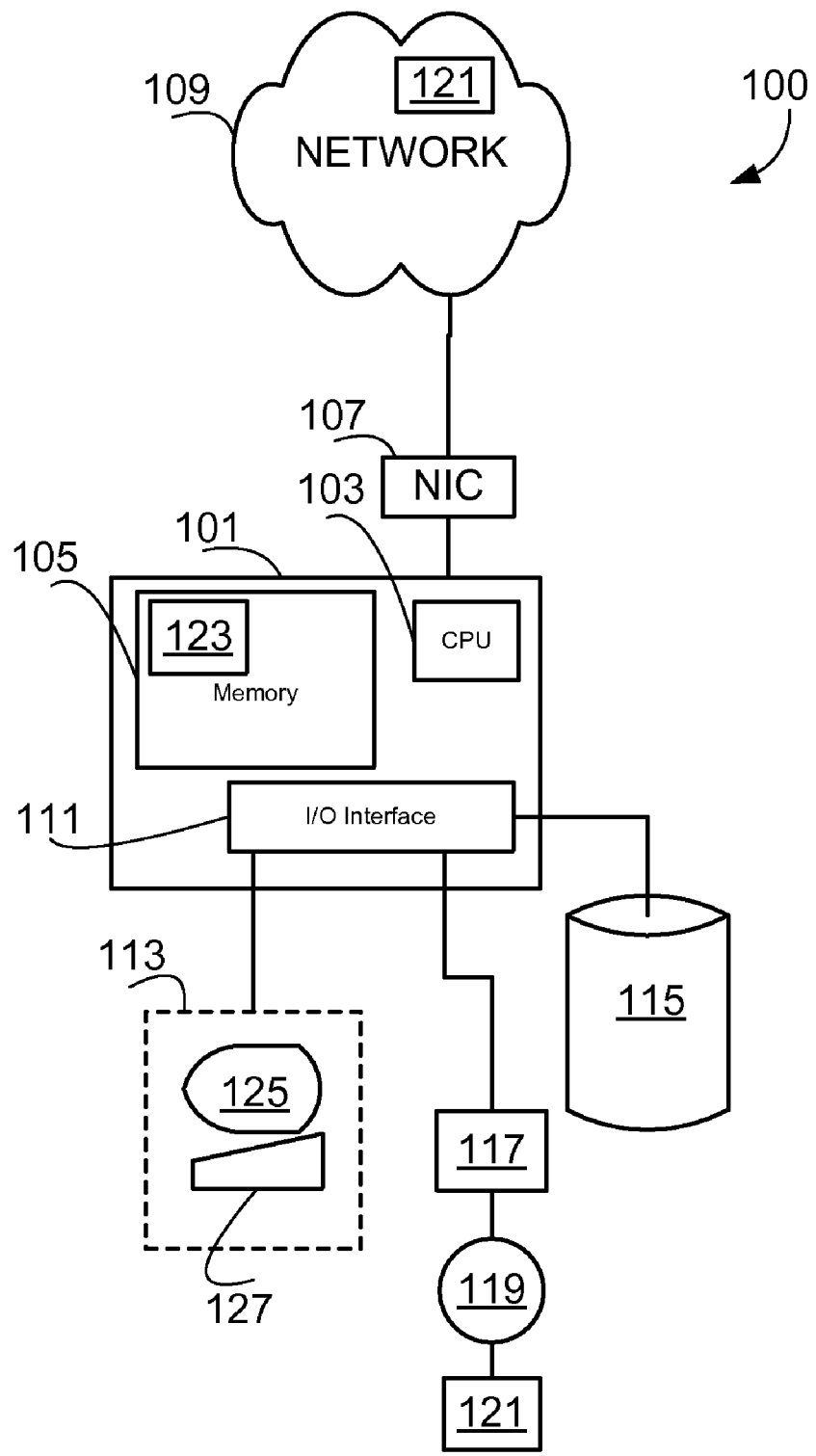
FIG. 1 illustrates a networked computer system in accordance with a preferred embodiment.

One aspect of the technology disclosed herein is a method for determining Rights to an entity. The method maintains data structures representing a set of entities. These entities include protected-entities and sensitivity-entities. Each of the sensitivity-entities is associated with a respective sensitivity access-control-list. The sensitivity-entities include a first sensitivity-entity that is associated with a first sensitivity-access-control-list. A first protected-entity being one of one or more of the protected-entities that is associated with the first sensitivity-entity. The method evaluates Rights to the first protected-entity with respect to the first sensitivity-access-control-list and enables access to the first protected-entity responsive to the Rights evaluation and presents the first protected-entity when access is enabled.

One skilled in the art will understand from the method how to cause a computer to perform the method and how to manufacture a program product that, when executed by a computer, will cause the computer to perform the method.

As previously described, there are a number of well defined and well known ways to access an entity in a system. These ways can be enhanced by the user of the technology disclosed herein to address the problems and issues previously described. This technology enables a sensitivity-enabled access control model. While much of the following is directed to application of sensitivity-enabled access control model as an enhancement of an implementation of discretionary access control model, the disclosed technology can also be applied to implementations of other access control models.

The inventors believe that a short gist of the meaning for some of the terminology used herein will be useful. Subject is a classification of entities that can contain other entities. While the term "subject" is commonly used in the literature, in the disclosed embodiment "Subjects" is a classification of entities that can include Principals and OwningSubjects (Actors (Users, Resources, SystemActors) and UserGroups) to whom Rights (Access Types or Privileges) can be endowed by a policy statement. OwningSubject is a Subject that can own an entity such as an Actor or UserGroup. A Principal is a Subject that cannot own an entity and specifies the level of Trust that the System has with the activating Actor. UserGroup is an OwningSubject that represents a group of Actors. An Actor is a classification of the entities that can act on the system. Notwithstanding the above, the usage herein of each of these terms as would be understood by one skilled in the art is what defines the term.

Privileges can only be granted through Roles. A Role is a set of Privileges and Access Types. A Role is ultimately applied to the Actor, Principal, or UserGroup and is limited to a named Scope. That is, an assigned Role is the triple of Role, Scope and Subject. In some embodiments, a Role entity must be within a visible scope of its use (that is, a Role defined within an Organization can only be assigned within the Scope of that Organization). A Privilege is thus scoped by the Scope of the assigned Roles. In most embodiments, Privileges are not granted outside of a Role. Roles are subsequently discussed throughout and in particular with respect to FIG. 7. Scope is subsequently discussed throughout and with respect to FIG. 8.

The triple of Subject, Access Type and Grant/Deny qualifier specifies an access control entry (ACE). A set of ACEs is called an access-control-list (ACL). In a sensitivity-enabled access control model a protected-entity entity associates two ACLs. One is the Local ACL and is private only to the entity. The other is via a sensitivity-entity.

Rights include both Privileges and Access Types. Access to an entity is controlled via the Access Types. Operations on an entity are allowed through Privileges. Herein the term "access" encompasses both 1) accesses via Access Types and 2) Operations via Privileges. One skilled in the art will understand from the context of the usage of the term "access" whether it encompasses actions resulting from having a Right, or is limited to an access to an entity via an Access Type. In case of doubt, the more general usage is intended.

The inventors have developed technology to protect an entity via a sensitivity-entity. The sensitivity-entity exists as a separate entity in the system. It can protect an entity to which it is associated. Such an entity is termed a protected-entity. An entity is converted into a protected-entity when it becomes associated with a sensitivity-entity. In addition a sensitivity-entity can be associated by multiple entities (simultaneously) to classify the associated multiple entities into the same access control category. Doing so solves a usability problem of having too fine grained control (for example, needing to control ACLs on a per entity basis) or not enough control (for example, everything within a Scope having the same ACL) as well as solving other problems including those previously described.

In some embodiments, the sensitivity name has no meaning to the system but generally does carry meaning to a human. Common sensitivities include "PRIVATE", "CONFIDENTIAL", "NORMAL" and "PUBLIC". The meanings of these named sensitivities can be defined by the user or system administrator. The system allows any number of sensitivities to be defined and used.

The technology described herein can be used in the context of a computing device.

FIG. 1 illustrates a networked computer system 100 that can incorporate an embodiment of the disclosed technology. The networked computer system 100 includes a computer 101 that incorporates a CPU 103, a memory 105, and a network interface 107. The network interface 107 provides the computer 101 with access to a network 109. The computer 101 also includes an I/O interface 111 that can be connected to a user interface device(s) 113, a storage system 115, and a removable data device 117. The removable data device 117 can read a computer-usable data carrier 119 (such as a fixed or replaceable ROM within the removable data device 117 itself (not shown); as well as a computer-usable data carrier that can be inserted into the removable data device 117 itself (such as a memory stick, CD, floppy, DVD or any other tangible media) that typically contains a program product 121. The user interface device(s) 113 can include a display device 125 and a user input device 127. The storage system 115 (along with the removable data device 117), the computer-usable data carrier 119, and (in some cases the network 109) comprise a file storage mechanism. The program product 121 on the computer-usable data carrier 119 is generally read into the memory 105 as a program 123 which instructs the CPU 103 to perform specified operations. In addition, the program product 121 can be provided from devices accessed using the network 109. One skilled in the art will understand that the network propagates information (such as data that defines a computer program). Signals can be propagated using electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 109. Thus, the network 109, like a tangible physical media, can be a computer-usable data carrier. One skilled in the art will understand that not all of the displayed features of the computer 101 need to be present for all embodiments that implement the techniques disclosed herein. Further, one skilled in the art will understand that computers are ubiquitous within modern devices ranging from as cell phones to vehicles to kitchen appliances etc.

The Inventors' sensitivity-enabled access control model adds a sensitivity-entity to the prior art access models. The resulting sensitivity-enabled access control model can be used in many access control scenarios (in particular to access control scenarios common to collaboration environments). One skilled in the art, after comprehending the technology disclosed herein, will understand that the sensitivity-entity differs from a "label" as used in a Label Security access control model in that the sensitivity-entity carries its own sensitivity-access-control-list that can interact with the access model's existing access-control-list when determining entity access. Such a one will also understand that the inventor's meaning of the term "Sensitivity" is completely different from the meaning of term "sensitivity" as used in the context of Microsoft Corporation's products. In particular, the Sensitivity capability described herein enables enforcement of Rights to be specified by sender of an e-mail and/or calendar event (and associated attachments) protecting the sent entities with a sensitivity-entity.

The sensitivity-access-control-list of the sensitivity-entity is used in the evaluation of an Actor's Rights to access or Operate on a protected-entity. In the sensitivity-enabled access control model, each entity can associate a local-access-control-list. In addition, protected-entities can also associate a sensitivity-entity that associates a sensitivity-access-control-list. A sensitivity-entity can itself associate a sensitivity-entity from a Scope closer to the root of the Scope hierarchy. (Thus, the sensitivity-entity is not allowed to associate itself). In some embodiments, the owner of a sensitivity-entity has Rights (allowed by the Owner Rights of the sensitivity-entity) to modify the settings of the sensitivity-access-control-list of the sensitivity-entity. For example, the owner must have the WRITE Access Type on the sensitivity-entity to modify any ACE in the sensitivity-access-control-list.

The local-access-control-list can be the same as used with the known prior art Access Control Model and is private to the entity (that is, the local-access-control-list is not shared by another entity). In contrast, the sensitivity-entity can be associated by multiple protected-entities. Rights to the protected-entity can be evaluated using either the local-access-control-list or the sensitivity-access-control-list, or determined using the union of the local-access-control-list and the sensitivity-access-control-list, and the like. In some embodiments, this evaluation can also be responsive to a Principal activated by Actor. In some embodiments, this evaluation can give precedence to deny Access Types when evaluating an Actor's Rights.

In some embodiments, an access control enforcement process first evaluates an Actor's Rights with respect to the Owner-specific GRANT and DENY Access Types (Owner's Rights). If access with respect to the Owner-specific GRANT and DENY Access Types cannot be determined, the access control enforcement process can (as directed by the sensitivity-entity) exclusively determine the Rights from the sensitivity-access-control-list, or can determine the Rights from a union of the protected-entity's local-access-control-list and the sensitivity-access-control-list of the associated sensitivity-entity. In the embodiment shown in FIG. 2, the Owner Rights are not enforced when SensitivityOnly is true. In other embodiments, the Owner Rights can be enforced before sensitivity ACE when SensitivityOnly is true In some embodiments, the access control enforcement process can include in its evaluation Rights with respect to Assigned-Role Privileges (for example, those of a role-based access control model).

Figure 2:
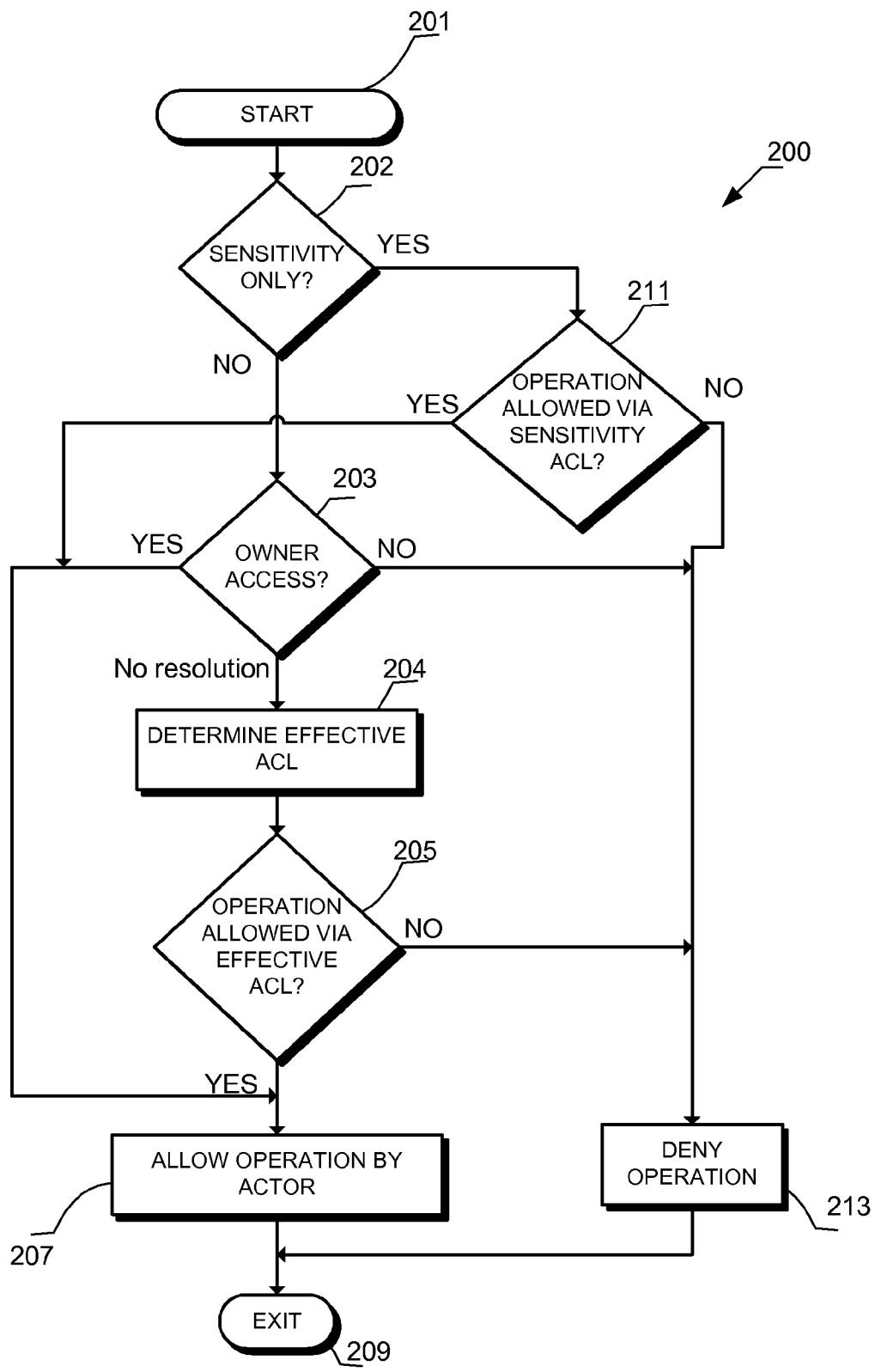
FIG. 2 illustrates an access control enforcement process.

FIG. 2 illustrates one embodiment of an access control enforcement process 200. The access control enforcement process 200 can be invoked whenever an Actor attempts to obtain a Right to a protected-entity, initiates through a start terminal 201, and continues to a 'sensitivity-only' decision procedure 202 that checks a 'SensitivityOnly' field 505 (subsequently described with respect to FIG. 5) to determine whether the sensitivity-access-control-list completely controls non-owner access to the protected-entity.

If the sensitivity-access-control-list does not completely control access to the protected-entity, the access control enforcement process 200 continues to an 'owner access' decision procedure 203 that determines whether the Actor has Owner Rights to the protected-entity (delegation is subsequently described with respect to FIG. 6). If the 'owner access' decision procedure 203 cannot determine whether the Actor has an explicit Grant or Denial of Right to the protected-entity, the access control enforcement process 200 continues to a 'determine effective ACL' procedure 204 that takes the union of the local-access-control-list, sensitivity-access-control-list and applicable Roles to determine the effective Rights for the Actor to the protected-entity. Next, an 'access allowed' decision procedure 205 determines whether the effective ACL from the 'determine effective ACL' procedure 204 allows the Actor to Operate on the protected-entity. If so, the access control enforcement process 200 continues to an 'allow Operation by Actor' procedure 207 that enables the Operations by the Actor and the access control enforcement process 200 completes through an exit terminal 209. Operations include accesses to the protected-entity via an Access Type as well as an Operation on the protected-entity allowed by a Role.

Enforcing the SensitivityOnly ACEs before the Owner Rights in this embodiment enables the Owner of the sensitivity-entity to gain control over the Owner Rights of the protected-entity when the owner of the sensitivity-entity is different from the owner of the protected-entity. The Owner Rights of a chain of sensitivity-entities (applied one on another without cycles) can become a chain of policies which can be controlled by the Owner Rights of the sensitivity-entity (owner of the Sensitivity entity) at the base of the chain. The sensitivity-entity at the base of the chain is not a protected-entity.

However, if the 'sensitivity-only' decision procedure 202 determines that the sensitivity-access-control-list completely controls non-Owner Rights to the entity, the access control enforcement process 200 continues to an 'allow sensitivity-only access' decision procedure 211 that determines whether the sensitivity-access-control-list of the sensitivity-entity associated with the protected-entity provides Rights to the Actor. If so, the access control enforcement process 200 continues to the 'allow Operation by Actor' procedure 207 for processing as previously described. Otherwise the access control enforcement process 200 continues to a 'deny access' procedure 213 that denies the Operation by the Actor on the protected-entity and the access control enforcement process 200 completes through the exit terminal 209.

If the 'owner access' decision procedure 203 determines that the Actor does not have Owner Rights to the protected-entity, access is denied by the 'deny access' procedure 213. If the 'owner access' decision procedure 203 determines that the Actor does have Owner Rights to the protected-entity, access is allowed by the 'allow Operation by Actor' procedure 207.

The 'determine effective ACL' procedure 204 can take the union of granted Access Types and the union of denied Access Types from the sensitivity-access-control-list, local-access-control-list, and RoleDef initions. With regard to RoleDefinitions, the 'determine effective ACL' procedure 204 considers all Access Types (both Grant and Deny) assigned through RoleDefinitions from the Scope hierarchy. Additional discussion about RoleDefinitions is subsequently provided with respect to FIG. 7.

In some embodiments the 'determine effective ACL' procedure 204 prioritizes the Access Types and Privileges by Distance with respect to Principal, User, and Group. This prioritization results in a list of ACEs (from the union of the relevant ACEs). The 'determine effective ACL' procedure 204 then applies a sequence of decisions, by checking the Access Types and Privileges of the Principal (distance 1), followed by the Access Types and Privileges of the User (distance 2), and followed by the Access Types and Privileges of the User-Groups that the Principal or User belongs to (distance 3). Thus, a READ Access Type granted to a Principal will override a denied READ Access Type applied on the User or any UserGroup to which the Principal belongs (Principal is subsequently discussed with respect to FIG. 3 and FIG. 6).

In the known discretionary access control models, the access control entry is specified as part of the local-access-control-list for the entity. However when a discretionary access control model is enhanced with sensitivity-entity support, the resulting sensitivity-enabled access control model encapsulates a named set of access control entries (subsequently described with respect to FIG. 3) composed of Access Types on protected-entities. In some embodiments, an access control entry can only be added, deleted, or modified by an Actor with, for example, a MODIFY_ACL Privilege.

The OwningSubject can always change the security attributes of an entity it owns. Some embodiments, to modify the sensitivity-entity or to associate the sensitivity-entity with an entity (to make that entity a protected-entity) require that the OwningSubject's Rights include the EXECUTE Access Type on the sensitivity-entity. Any Subject can associate the sensitivity-entity with an entity if the Subject has the MODIFY_ACL or SECURITY Privilege on the entity to be protected and the EXECUTE Access Type on the sensitivity-entity.

Those not skilled in the art may find it useful to review Snodgrass, R. *The Interface Description Language: Definition and Use*. Computer Science Press, 1989, that describes the formalism for the notation used in FIGS. 3-8. However, FIGS. 3-8 do not use the complete formalism, but do provide sufficient detail such that one skilled in the art would be able to practice the disclosed technology without undue experimentation.

Figure 3:
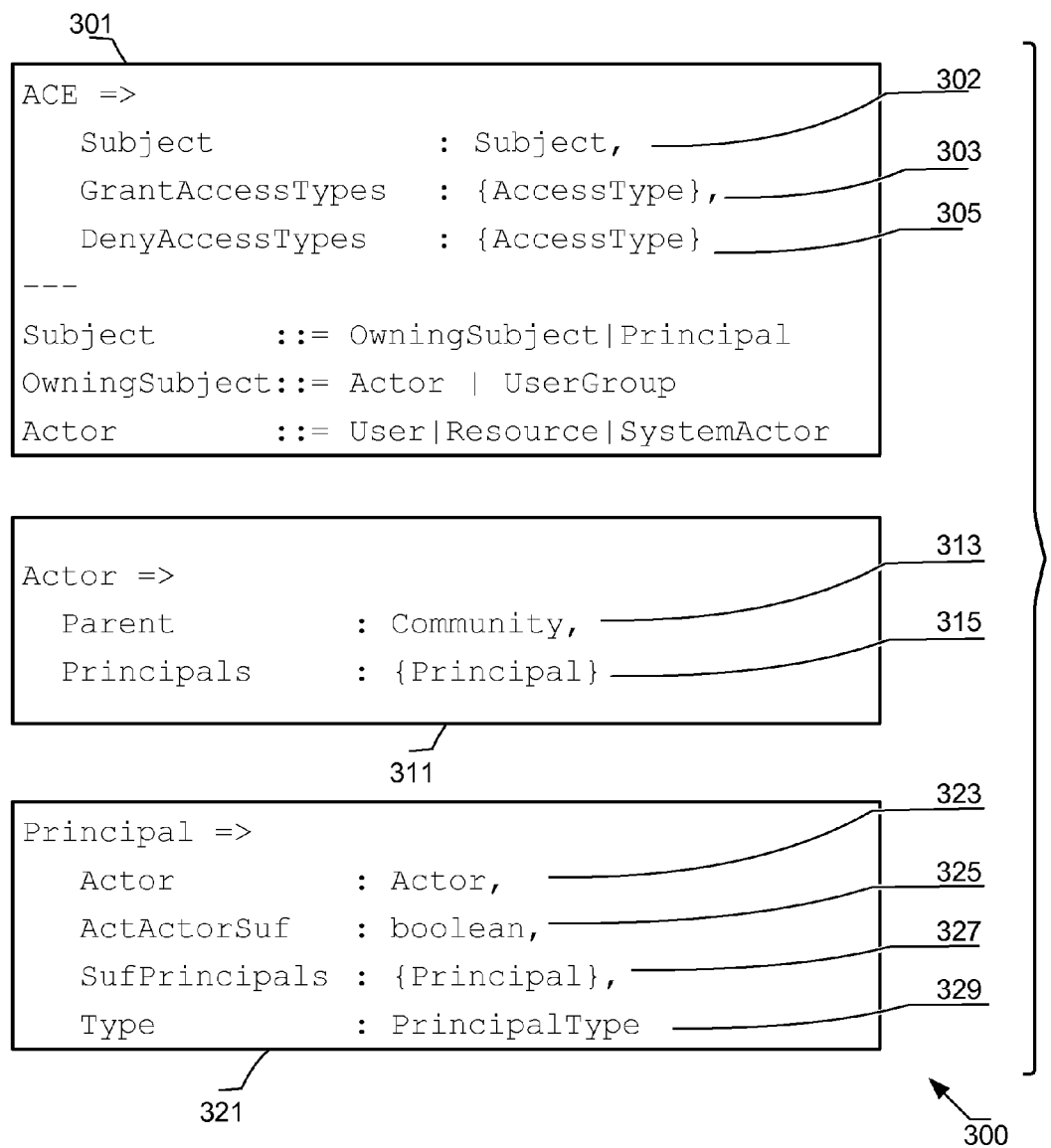
FIG. 3 illustrates data structures related to an access control entry.

FIG. 3 illustrates access-control-entry related data structures 300 that can be used to effectuate an access control entry. The access-control-entry related data structures 300 can include an 'access-control-entry' structure 301, an 'Actor' Structure 311 and a 'Principal' Structure 321. The 'access-control-entry' structure 301 can include a 'subject' field 302, a 'GrantAccessTypes' field 303, and a 'DenyAccessTypes' field 305. The 'GrantAccessTypes' field 303 and the 'DenyAccessTypes' field 305 specify Access Types granted and denied to the Subject identified in the 'subject' field 302.

An Actor is an OwningSubject that can Operate on entities. In some embodiments, the Actor belongs to one primary Community (for example, an enterprise or organization) and can optionally belong to multiple secondary organizations. The SystemActor is a classification of programs that can act on the system. The SystemActor must possess the necessary Rights to act on the system. The Actor can be represented by the 'Actor' Structure 311.

A Principal is a set of Rights that are available to the Actor responsive to how the Actor has been authenticated to the sensitivity-enabled delegation control model. For example, but without limitation, whether the Actor has been authenticated using a password, personal identification number (PIN), biometrics, etc. The Principal can be represented by the 'Principal' Structure 321.

Principals can be owned by the Actor, by another Actor, by the SystemActor, etc. A Principal owned by an Owning Actor can be provided to another Actor during delegation to specify what Rights the Owning Actor allows to the other Actor. The use of Principals for delegation is subsequently described at least with respect to FIG. 6.

In some embodiments, the 'Actor' Structure 311 associates the Actor with its parent Community Container via a 'Parent' field 313 and its Principals via a 'Principals' field 315.

The 'Principal' Structure 321 represents the level of Trust the system has of an Actor. For example, a Principal can be activated for an Actor when the Actor uses a biometric credential to identify his/herself to the system, while a different Principal can be activated when the Actor uses a personal identification number via a telephone to identify his/herself to the system. In some embodiments, the 'Principal' Structure 321 associates with its Actor via an 'Actor' field 323. Within embodiments that enable delegation, the 'Principal' Structure 321 can also include an 'ActActorSuf' field 325 and a 'SufPrincipals' field 327 both of which are subsequently described with respect to FIG. 6.

A 'Type' field 329 identifies the characteristics of how the system established Trust for the Actor. These characteristics can include credentials (such as password, PIN, biometric, smartcard, certificate, SSO, Kerberos, etc.), the characteristics of network security (such as SSL, HTTPS, VPN, etc.), the characteristics of a client (such as PDA, Web Client, Native Client, Workplace, etc.), the characteristics of protocol (such as HTTP, CMS, SMTP, XMPP, IMAP, etc.), and other security characteristics.

Users, Resources, and SystemActors are Actors. User is an actor that represents a human Actor. A UserGroup is a group of Users. As has been previously discussed, the SystemActor is an Actor that represents a program. A Resource is an Actor that can be represented by a software agent that can act on an entity. The software agent generally represents something physical, for example a conference room, projector, computer, building, etc. Hence, Resources in an enterprise can be Subjects of an access control policy. In addition, Resources can be an OwningSubject and thus have owner-specific Rights on the owned entities that can be delegated to Users.

All entities in the sensitivity-enabled access control model can associate both a local-access-control-list and a sensitivity-access-control-list. The access-control-entry related data structures 300 can be associated with the local-access-control-list and/or the sensitivity-access-control-list to control access to the entity.

Figure 4:
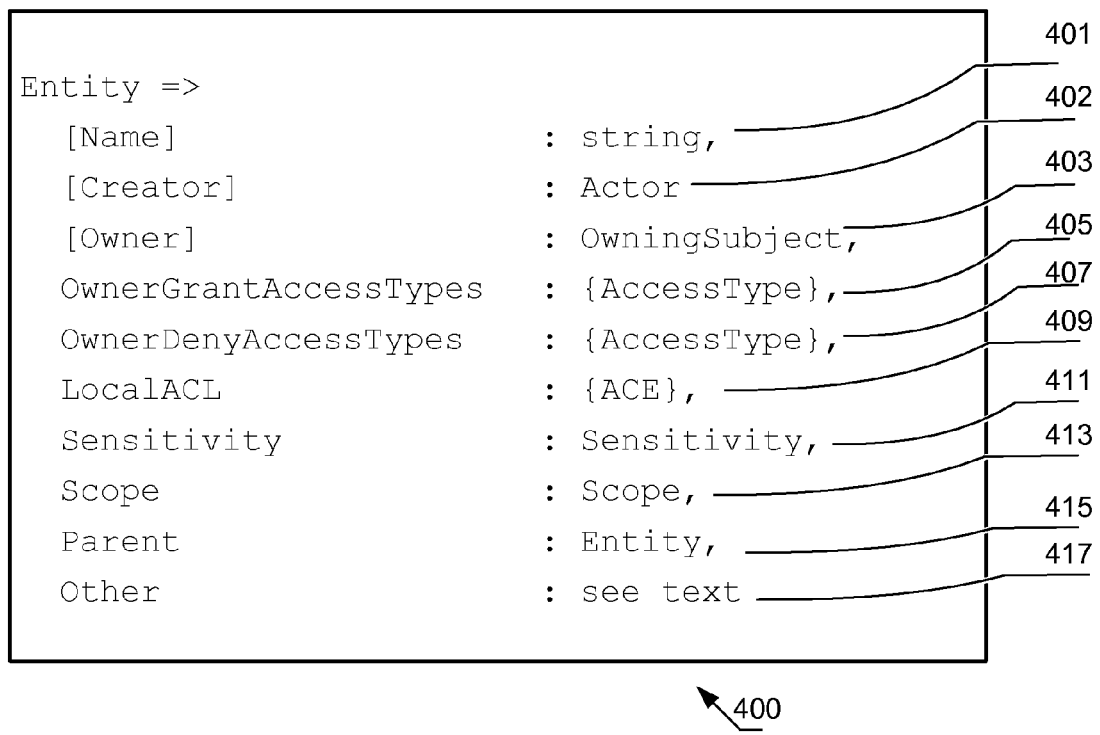
FIG. 4 illustrates an entity data structure.

FIG. 4 illustrates an entity data structure 400 that includes a 'Name' field 401, a 'Creator' field 402, an 'Owner' field 403, an 'OwnerGrantAccessTypes' field 405, an 'OwnerDenyAccessTypes' field 407, a 'LocalACL' field 409, a 'Sensitivity' field 411, a 'Scope' field 413, a 'Parent' field 415 and an 'Other' field 417.

The 'Creator' field 402 identifies the Actor who caused the creation of the entity. The 'Owner' field 403 identifies the current OwningSubject of entity represented by the entity data structure 400. Note that the owner specified by the 'Owner' field 403 can be either a single Actor, a UserGroup, SystemActor, or Resource as shown in FIG. 3.

The Grant and Deny Access Types for the OwningSubject are specified by the 'OwnerGrantAccessTypes' field 405 and the 'OwnerDenyAccessTypes' field 407. The 'LocalACL' field 409 associates (in some embodiments via the access-control-entry related data structures 300) a local-access-control-list. The 'LocalACL' field 409 is analogous to the access-control-list used in existing access control models.

The 'Sensitivity' field 411 can associate a sensitivity-entity (subsequently described with respect to FIG. 5) with the entity data structure 400. An entity that associates a sensitivity-entity is a protected-entity. A sensitivity-entity can itself be a protected-entity if associated with a sensitivity-entity defined with respect to a scope that is closer to the root of the scope hierarchy.

The 'Scope' field 413 identifies the scope that applies to the entity and can be used when determining an Actor's Rights as against the assigned or delegated Principal (for example, as subsequently described with respect to FIG. 6).

The 'Parent' field 415 identifies the entity (for example, a container entity, workspace entity, etc.) that contains the instant entity and the 'Other' field 417 represents other fields that can contain Metadata for the entity (for example, creation and modification timestamps etc.).

A sensitivity-entity (subsequently discussed with respect to FIG. 5) is an entity (such as described with respect to FIG. 4) that associates a sensitivity-access-control-list. The sensitivity-access-control-list is separate from the access-control-list that protects access to the sensitivity-entity itself (the 'LocalACL' field 409). The sensitivity-entity can be defined with respect to a scope (for example, a workspace scope).

The sensitivity-access-control-list contributes to the determination of an Actor's Rights to access all protected-entities associated with the associated sensitivity-entity. Thus, the sensitivity-entity can classify multiple protected-entities within a scope (for example, a Workspace, Folder, Enterprise, etc.) into the same access control category. Some Containers can have a default sensitivity-entity that is associated with each protected-entity created within that Container. In some embodiments the default sensitivity-entity can be responsive to the type of sensitivity-entity to which it is applied (for example Confidential for calendar Invitations, Public for Tasks, and Normal for Documents).

In some embodiments, a sensitivity-entity can be associated with an entity that is not protected to make that entity a protected-entity, can be removed from a protected-entity to remove the sensitivity protection, or modified to change the protection for each protected-entity that associates the modified sensitivity-entity. In some embodiments, the Actor operating on the entity/sensitivity-entity is required to be an OwningSubject having the EXECUTE Access Type on the sensitivity-entity and the MODIFY_ACL Privilege on the scope containing the entity to be protected.

As previously discussed, the RFC 2445 iCalendar specification supports a property name CLASS to define the access classification for a calendar component. In a sensitivity-enabled access control model, it is the sensitivity-access-control-list in the sensitivity-entity associated with the calendar component protected-entity that defines access to the calendar component. Generally, a default sensitivity-entity within the Owner's personal workspace is associated with the calendar component entity when it is created or sent.

FIG. 5 illustrates a sensitivity-entity data structure 500 that includes a 'Description' field 501, a 'Parent' field 503, the 'SensitivityOnly' field 505, a 'Mode' field 507, and a 'SensitivityACL' field 509. One skilled in the art will understand that because the sensitivity-entity data structure 500 is an entity it includes the information contained in the entity data structure 400 (in a manner somewhat analogous to—in an object-oriented programming sense—a relationship between a class and a superclass). Thus, the sensitivity-entity data structure 500 includes the previously discussed fields from the entity data structure 400.

The 'Description' field 501 and the 'Name' field 401 can contain human-readable text strings that describe and name the sensitivity-entity represented by the sensitivity-entity data structure 500; the 'Parent' field 503 identifies the sensitivity-entity's scope; the 'SensitivityOnly' field 505 is a flag (subsequently described and briefly discussed with respect to the 'sensitivity-only' decision procedure 202) that controls the contribution of the 'LocalACL' field 409 to the evaluation of the Actor's Rights to the protected-entity; the 'Mode' field 507 is used when performing administration operations on the sensitivity-access-control-list; and the 'SensitivityACL' field 509 associates the sensitivity-access-control-list via the access-control-entry related data structures 300.

While the 'Name' field 401 value need not have any meaning to the sensitivity-enabled access control model, in most embodiments this value does have meaning to a human. Common values for this field could include Private, Confidential, Normal and Public. The sensitivity-access-control-list represented by these values can be defined by a user or system administrator. The sensitivity-enabled access control model allows any number of sensitivities to be defined and is not limited to the example list above.

A sensitivity-entity can be defined with respect to a scope (for example a workspace, organization, enterprise etc. scope: see the 'Parent' field 503). The sensitivity-entity only applies within the scope for which it is defined. In some embodiments the values of the 'Name' field 401 for the sensitivity-entity data structure 500 are unique within its scope.

The 'SensitivityOnly' field 505 indicates whether the 'LocalACL' field 409 and Roles are to be used when evaluating the Actor's Rights to the protected-entity as is shown by the 'sensitivity-only' decision procedure 202 of FIG. 2. When enabled, the 'SensitivityOnly' field 505 does not prevent an Actor from setting or changing the 'LocalACL' field 409 of the protected-entity (note however, that while the 'SensitivityOnly' field 505 is enabled the state of the 'LocalACL' field 409 is not used when determining an Actor's Rights to the protected-entity so such changes to the 'LocalACL' field 409 would be ineffective until the 'SensitivityOnly' field 505 is disabled).

One example use of the 'SensitivityOnly' field 505 is to mark a protected-entity as Private. Such a sensitivity-entity allows the Owner of a protected-entity to grant whatever Access Types he/she desires to another as well as deny all Access Types to everyone else. Because the associated sensitivity-access-control-list is the only access-control-list used to grant access to the protected-entity when the 'SensitivityOnly' field 505 is enabled, there the user is less likely to accidentally enable access to the protected-entity by another as a consequence of changing the 'LocalACL' field 409.

The 'Mode' field 507 is used to specify whether the protected-entity associated with the sensitivity-entity data structure 500 can be delegated or not as is subsequently described with respect to FIG. 6.

While the sensitivity-enabled access control model can be used in any scope (for example, Workspace, Enterprise, Organization, etc.), the sensitivity-enabled access control model is particularly useful when used in the personal workspace scope because it is the user's configuration of the sensitivity-access-control-list that defines the meaning of the Protection provided by the sensitivity-entity.

Workspaces can be seeded with sensitivity-entities using Workspace Templates to define set of sensitivity-entities that a user can modify and/or supplement as needed. Furthermore, a default sensitivity-entity can be defined for a scope to specify the initial sensitivity for any protected-entity created in the scope.

An example set of semantics and intentions for Workspace Templates that represent four levels of Sensitivity that can be associated with any protected-entity can include the following Sensitivity names:

1) PUBLIC—protected-entities that are accessible to all Actors in the system, including external Actors that have guest access to the Workspace.
2) NORMAL—protected-entities that are accessible to other Actors via the union of the access-control-list in the 'LocalACL' field 409 with the sensitivity-access-control-list in the sensitivity-entity associated with the protected-entity.
3) CONFIDENTIAL—protected-entities that are not accessible by default to other Actors in the system unless the access is allowed through delegation.
4) PRIVATE—protected-entities marked that are not accessible to any other Actors in the system including the Owner's delegated-to Actors. Typically the private Sensitivity will be marked as non-delegatable (subsequently described with respect to FIG. 6). For instance, an email message (from a family member), calendar event (a doctor appointment), and document (a personal resume) can be marked as PRIVATE and not exposed to any other Actor unless the Owner changes the sensitivity level from PRIVATE to some other setting.

In embodiments where Sensitivity can be inherited, the same sensitivity-entity associated with the parent Container (a protected-entity) can be associated with the child protected-entity. Thus, changing the 'SensitivityACL' field 509 for the parent Container would change the protection of both the Container and the Child protected-entities.

In some embodiments, when a protected-entity is moved, copied, or delivered within its current scope its associated sensitivity-entity does not change. In such embodiments when a protected-entity is moved to a different scope, the sensitivity-enabled access control model re-associates the protected-entity with an appropriate sensitivity-entity in the new scope. This association can be accomplished using a resolution rule (for example, but without limitation) by: reassigning a visible sensitivity-entity that has a compatible sensitivity name. Compatibility of the sensitivity name can be determined by matching a sensitivity-entity with the same sensitivity name in the different scope, using the default sensitivity-entity of the different scope, inheriting a sensitivity-entity associated with the receiving container, or removing the sensitivity-entity after the move, copy, or delivery. In some embodiments, the resolution rule can be selected by a user. In most embodiments, the move, copy, or deliver operation and the sensitivity re-associate operation are performed in a single, atomic action.

The sensitivity-entity itself can be a protected-entity (if it associates a different sensitivity-entity) and is protected from change using the same access control rules as for any entity. This allows sensitivity-entities to be protected by sensitivity-entities of a scope closer to the root of the scope hierarchy having names such as "Team Administered," "Delegated," "Audited," etc.

In addition to using the sensitivity-enabled access control model (that can, for example, combine a discretionary access control model and the technology disclosed herein) to grant Access Types to a protected-entity, the technology disclosed herein can also use Roles.

It is cumbersome to share a set of protected-entities using a traditional delegation control model because such models require an explicit access grant to a delegated-to Actor via, for example, the local-access-control-list of each shared entity.

The sensitivity-enabled access control model enables convenient and efficient delegation of Rights to protected-entities.

Actors, SystemActors, Principals, Resources, and UserGroups can be Subjects identified by the 'access-control-entry' structure 301 and are used when applying the sensitivity-access-control-list or the local-access-control-list. Each Actor may own a set of Principals. An owned Principal can be delegated by a delegated-by Actor to a delegated-to Actor.

An Actor can activate one of the Principals in the 'Principals' field 315 which contains or references the Principals owned by or delegated-to the Actor.

The delegated-by Actor can grant Privileges to the delegated-to Actor by creating a Principal that associates the desired Privileges and Scope, and delegating that Principal to the delegated-to Actor. The delegated-to Actor can assume the "identity" of the delegated-by Actor "by activating" the delegated Principal provided by the delegated-by Actor). The system then can determine that the delegated-to Actor has the Right to Operate on an entity as if he/she were the delegated-by Actor. In some embodiments an audit log will indicate that the delegated-to Actor performed the Operation under authorization of the delegated-by Actor. The associated Scope cannot be closer to the root of the scope hierarchy than the Scope assigned to one of the Roles available to the delegated-by Actor. One skilled in the art will understand that the rights provided by the delegated-by Actor can include the owner rights.

Figure 6:
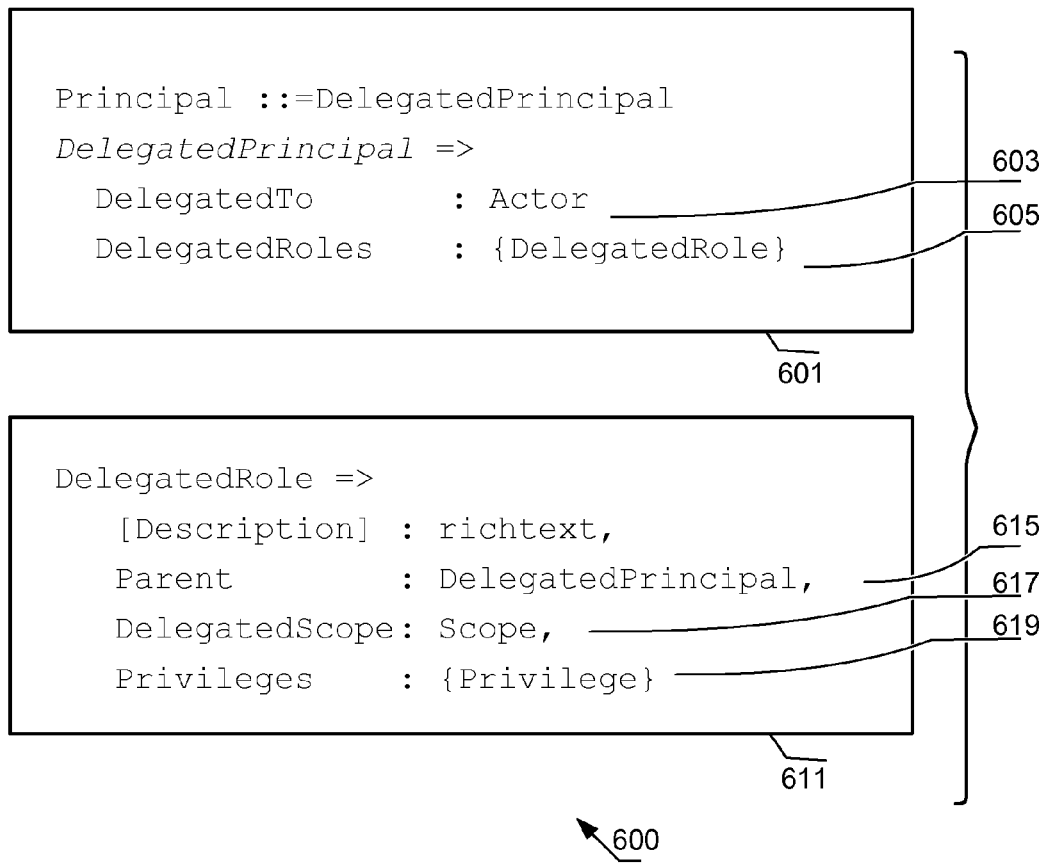
FIG. 6 illustrates a delegation-related set of data structures.

FIG. 6 illustrates a delegation-related set of data structures 600 that includes a 'DelegatedPrincipal' structure 601 and a 'DelegatedRole' structure 611. The 'DelegatedPrincipal' structure 601 includes a 'DelegatedTo' field 603 and a 'DelegatedRoles' field 605. The 'DelegatedTo' field 603 associates the delegated-to Actor to which the DelegatedPrincipal is directed. The 'DelegatedRoles' field 605 associates the DelegatedRoles that the delegated-by Actor authorized the delegated-to Actor to use and are subsequently described with respect to FIG. 7. The 'DelegatedPrincipal' structure 601 can include or inherit the fields of the 'Principal' Structure 321 through Superclass relation.

The 'DelegatedRole' structure 611 is associated by the 'DelegatedRoles' field 605 and contains a 'Parent' field 615, a 'DelegatedScope' field 617, a 'Privileges' field 619, and a self evident description field. The 'Parent' field 615 associates a 'DelegatedPrincipal' structure 601 and returns the Actor from the 'DelegatedTo' field 603 of the 'DelegatedPrincipal' structure 601; the 'DelegatedScope' field 617 associates a delegated Scope; and the 'Privileges' field 619 associates the Privileges available to the DelegatedRole.

The DelegatedPrincipal can be activated only by the delegated-to Actor acting on behalf of the delegated-by Actor.

Some sensitivity-entities can be conditioned to restrict access to their associated protected-entities to be by delegation only. When a sensitivity-entity is set to by-delegation-only, some embodiments of the sensitivity-enabled access control model require that only Principals that belong to the delegated-by Actor can be used as Subjects in the sensitivity-access-control-list. When conditioning a sensitivity-entity to be by-delegation-only some embodiments also enable the 'SensitivityOnly' field 505 so that the protected-entity's local-access-control-list will not be considered. Other Subjects can only access the protected-entity associated with such a sensitivity-entity if the Subject is a delegated-to Actor from the delegated-by Actor who has the WRITE Access Type to the sensitivity-entity. A sensitivity-entity marked as confidential can also be configured to have this behavior. In addition, a sensitivity-entity can be marked as non-delegateable such that its protected-entities cannot be accessed by a delegated-to Actor. The PRIVATE sensitivity can be marked as non-delegateable.

Thus, for example as applied to a messaging system, a delegated Principal can be activated by a delegated-to Actor acting on behalf of a delegated-by Actor. When the delegated-to Actor sends a message or an invitation, the 'DelegatedTo' field 603 associates the delegated-to Actor with the Right to perform the Operation, while the sender of the message or invitation is the delegated-by Actor identified by the 'Actor' field 323 of the 'Principal' Structure 321.

To summarize, the delegated-by Actor owns the delegated Principal in his/her list of Principals. It is the delegated-by Actor who allows the delegated-to Actor to activate the Principal owned by the delegated-by Actor.

The Actor of a Principal (the 'Actor' field 323) refers to the Actor who Owns the Principal in the 'Principals' field 315. The Actor who activates the Principal may not be the Owner of the Principal if the Principal has been delegated. If the 'ActActorSuf' field 325 is enabled, the Principal can be activated as long as any of the Principals for the activating Actor has been activated by authentication. Nominally, the activating Actor will activate one or more Principals using strong credentials before activating additional Principals that do not require credentials.

In some embodiments, if the 'ActActorSuf' field 325 is not enabled, the activating Actor can activate the Principal without authentication only if there exist Principals in the 'SufPrincipals' field 327 and the Actor has activated all of them. That is, the sufficient condition takes the conjunction of all of the Principals specified in the 'SufPrincipals' field 327 in order for the Principal to be activated without further authentication. Nominally, each Principal in the 'SufPrincipals' field 327 is activated using a strong credential.

Sensitivity-entities can simplify delegation by granting or denying Rights to a delegated Principal using the sensitivity ACL of the sensitivity entity with respective to Rights to a set of protected-entities as previously described.

Figure 7:
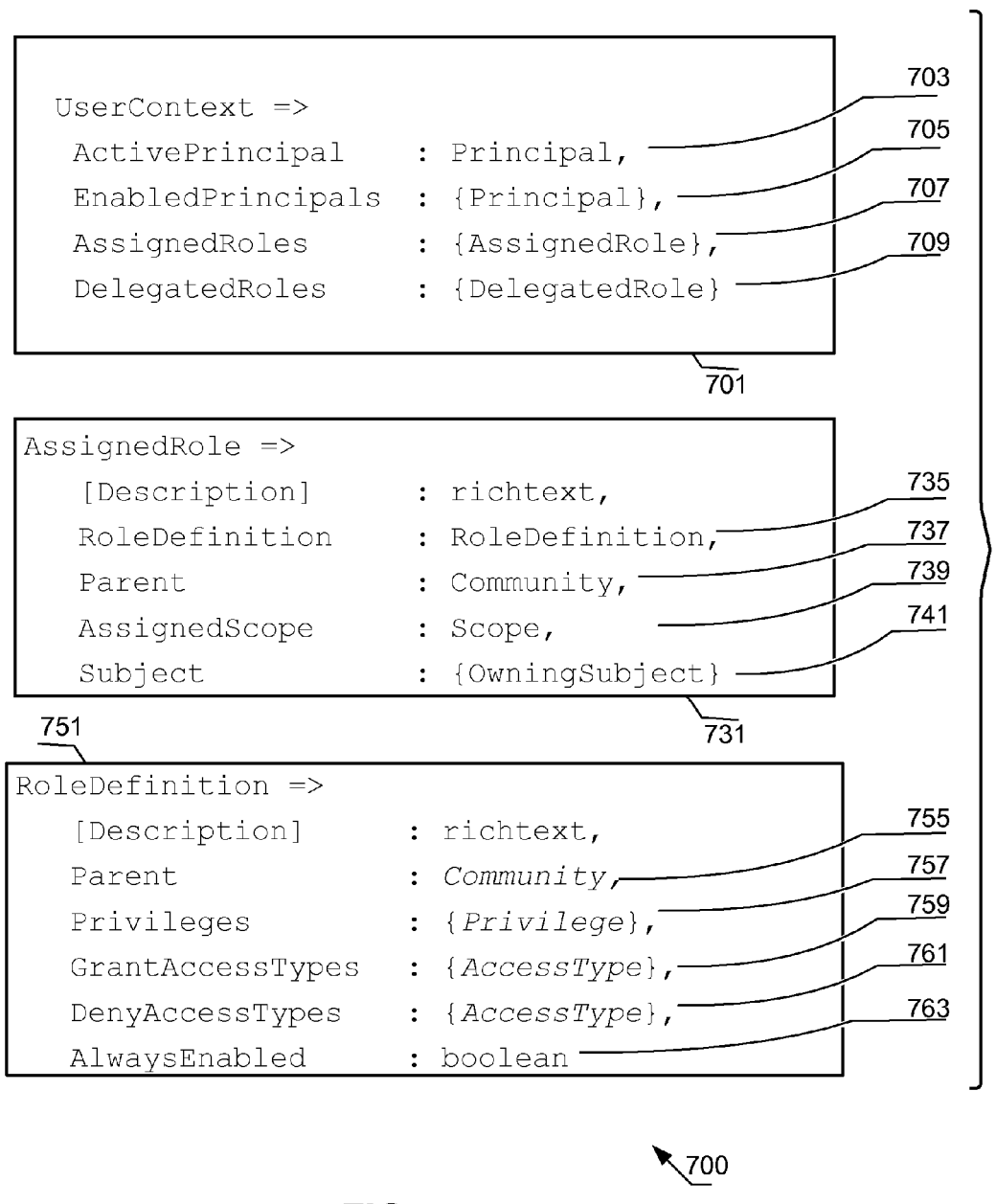
FIG. 7 illustrates a user-context-related set of data structures.

FIG. 7 illustrates a user-context-related set of data structures 700 that include a 'UserContext' data structure 701, an 'AssignedRole' structure 731, and a 'RoleDefinition' structure 751. The 'UserContext' data structure 701 includes an 'ActivePrincipal' field 703 that identifies the currently active Principal for the user. An 'EnabledPrincipals' field 705 associates the Principals that are available to the user for activation. An 'AssignedRoles' field 707 associates the Roles that have been delegated-to the user associated with the 'UserContext' data structure 701. A 'DelegatedRoles' field 709 associates the Roles delegated-to the user associated with the 'UserContext' data structure 701. The 'AssignedRoles' field 707 and the 'DelegatedRoles' field 709 are associated with the user of the 'UserContext' data structure 701 through the currently active Principal of the 'ActivePrincipal' field 703. Principals have been previously discussed.

The 'AssignedRole' structure 731 includes a 'Role Definition' field 735, a 'Parent' field 737, an 'AssignedScope' field 739, a 'Subject' field 741, and a self evident description field. The 'Role Definition' field 735 associates the 'RoleDefinition' structure 751 (subsequently discussed). The 'Parent' field 737 associates a Community Scope that contains the User. The 'AssignedScope' field 739 is the Scope within which the AssignedRole is to be applied. The 'Subject' field 741 associates the Subject (which can be an Actor, Principal, or UserGroup) with the AssignedRole.

The 'RoleDefinition' structure 751 includes a 'Parent' field 755, a 'Privileges' field 757, a 'GrantAccessTypes' field 759, a 'DenyAccessTypes' field 761, an 'AlwaysEnabled' field 763 and a self-evident description field. The 'Parent' field 755 references the Community in which the 'RoleDefinition' structure 751 is defined. The 'RoleDefinition' structure 751 can be assigned to the Actors and UserGroups in the same or higher Community (a parent or ancestor Community closer to the root scope). The 'Privileges' field 757 associates provisioning Privileges such as EMAIL_USER, CONF_USER, etc. The 'GrantAccessTypes' field 759 and the 'DenyAccessTypes' field 761 associates Access Types granted and denied respectively. The 'AlwaysEnabled' field 763 specifies that the RoleDefinition cannot be disabled. If an AlwaysEnabled RoleDefinition is assigned to the currently active Principal of the 'UserContext' data structure 701 or is assigned to the user of the 'UserContext' data structure 701, then the corresponding AssignedRole is always applied by the access control enforcement process 200 of FIG. 2.

Figure 8:
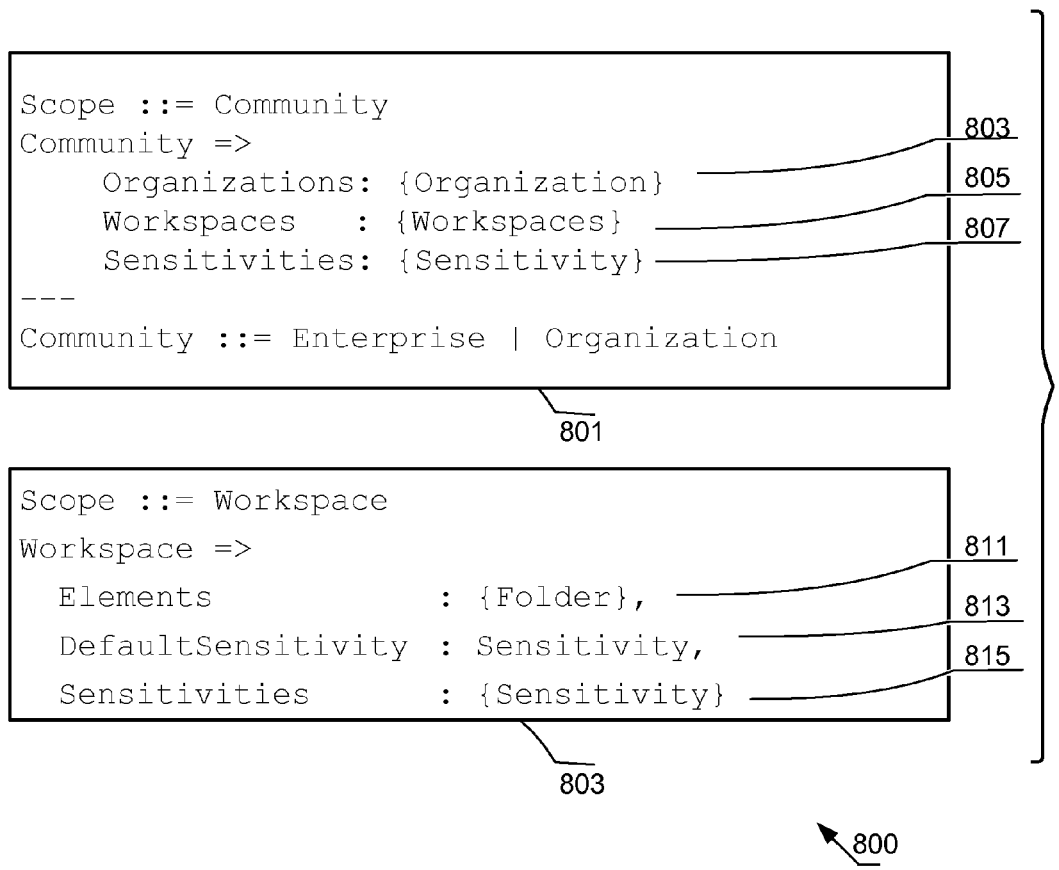
FIG. 8 illustrates Scope-related data structures.

FIG. 8 illustrates Scope related data structures 800 such as the 'Community' data structure 801 and the 'Workspace' data structure 803. The 'Community' data structure 801 includes an 'Organizations' field 805, a 'Workspaces' field 807, and a 'Sensitivities' field 809. The 'Organizations' field 805 associates sub-Organizations such as subsidiaries, divisions, departments, groups, etc. The 'Workspaces' field 807 associates the Workspaces within the Community, and the 'Sensitivities' field 809 associates the Sensitivities that can be used to protect the entities within the Community.

The 'Workspace' data structure 803 includes an 'Elements' field 811, a 'DefaultSensitivity' field 813 and a 'Sensitivities' field 815. The 'Elements' field 811 associates folders that are themselves containers. The 'DefaultSensitivity' field 813 associates the default sensitivity-entity for elements created in the Workspace, and the 'Sensitivities' field 815 associates the Sensitivities that can be used to protect the entities within the Workspace.

One skilled in the art will understand that the sensitivity-access-control-list can be associated with the sensitivity-entity in many ways known in the art (for example, by including the sensitivity-access-control-list as part of the sensitivity-entity, by maintaining a pointer or other ID to the sensitivity-access-control-list or to the access-control-entry related data structures 300 in the sensitivity-entity, etc.). Such a one will also understand that many systems can implement a proxy (for example, a file shortcut) to represent an entity.

The technology disclosed herein is applicable to, for example but without limitation, collaboration systems, messaging systems, content management systems and the like.

One skilled in the art will understand that the phrase "presenting an entity" includes operations such as, but not limited to: opening, editing, creating, deleting, displaying, printing, reading, writing, executing from, managing, archiving, copying, etc. the entity. For example, a user of such a system can execute a program that reads data from a file, performs some operation on the file, invokes a service on the entity. The User's Rights to read the file can be determined using the user's Access Types and Privileges and if satisfied, the data in the file will be presented to the user's program.

As used herein, a procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, such a one will understand that such logics includes delegation logic, evaluation logic, permission logic, presentation logic, protection logic, re-association logic, receiver logic, selection logic, owner determination logic, actor determination logic, enablement logic entity creation logic, etc.

One skilled in the art will understand that the network carries information (such as informational data as well as data that defines a computer program). The information can also be propagated using a carrier-wave. Signals capable of propagating the information includes electromagnetic signals, visible or invisible light pulses, signals on a data bus, or signals propagated over any wire, wireless, or optical fiber technology that allows information to be transmitted over a network. Programs and data are commonly read from both tangible physical media (such as a compact, floppy, or magnetic disk) and from a network. Thus, the network, like a tangible physical media, can be a computer-usable data carrier.

From the foregoing, it will be appreciated that the sensitivity-enabled access control model has (without limitation) the following advantages:

The sensitivity-enabled access control model enables multiple inheritances from the container hierarchy.

The sensitivity-enabled access control model allows the use of multiple combinations of features such as sensitivity and delegation to improve the conciseness and expressiveness of access control policies.

The sensitivity-enabled access control model enables one to define a named set of Objects and deploy the access control policy of the named set of Objects exclusively and independently of access control policies on other Containers of the same Objects.

The sensitivity-enabled access control model enables the determination of the Actor's Rights exclusively based on the Sensitivity and exclusive of other Access Types assigned to the protected-entity.

The sensitivity-enabled access control model enables use of the same access control model to documents, email messages, calendar invitations, task assignments, and document attachments therein in an efficient and uniform way.

The sensitivity-enabled access control model enables sharing of protected-entities without the need to individually delegate the entity to a set of Subjects.

The sensitivity-enabled access control model enables the use of a Workspace as the administrative boundary for the access control policy for all Artifacts in the Workspace. The principle of least privileges and separation of duty characteristics can be designed into the access control policy of the Workspace and exclusively applied.

The sensitivity-enabled access control model enables simple and understandable enforcement of the user's intention and semantics of a sensitivity level (for example, such as what private or confidential means to the user).

The sensitivity-enabled access control model enables a unified object model wherein documents, messages, invitations, tasks, etc., are all treated uniformly as artifacts.

The sensitivity-enabled access control model enables the use of a workspace as the namespace for sensitivities and delegation, significantly simplifies the access control of artifacts, and improves data security.

The sensitivity-enabled access control model enables an OwningSubject to have explicit and definite control of Rights to a protected-entity by allowing the Owning-Subject to condition the sensitivity-entity such that the Rights are determined using the sensitivity-access-control-list and not the respective local-access-control-list of the protected-entity.

The sensitivity-enabled access control model, by allowing a Resource to be an OwningSubject enables the Resource to have owner-specific Access Types on the entities it owns as well as privileges. These Access Types and Privileges can be delegated to Users.

The sensitivity-enabled access control model, by defining Resource as a subclass of Subject, provides stable enterprise access control policies for an enterprise when the set of enterprise users frequently changes. The owner Rights and AssignedRoles of the Resource, which are part of the stable access control policies, can be delegated to frequently changing enterprise users by reconfiguring the DelegatedPrincipals of the Resource.

The sensitivity-enabled access control model enables a given sensitivity-entity to define a specific access control category that can be used to classify multiple protected-entities by the defined access control category. Thus, the use of the sensitivity-entity provides a level of access control that is intermediate between a fine-grain control system (for example, one that requires an access-control-lists on a per-entity basis) and a not having enough control (for example, wherein access to each entity within a scope is controlled by the same access-control-lists).

The sensitivity-enabled access control model enables an OwningSubject to control access to the owned protected-entities without the need to establish burdensome Trust relationships between the systems that could possibly access the protected-entities.

The sensitivity-enabled access control model enables an OwningSubject to use delegated-to Actors while still providing the assurance that a protected-entity marked PRIVATE will not be available to the delegated-to Actors.

The sensitivity-enabled access control model enables an OwningSubject to control which delegated-to Actors can access protected-entities marked CONFIDENTIAL by requiring that the accessing delegated-to Actor has activated a delegated Principal owned by the Owning-Subject. The inventors have found that this aspect of the technology enables delegation to be successfully used in a collaboration environment.

The use of the sensitivity-entity provides a user and system administrator with a level of access control that is intermediate between a fine-grain control system (for example, one that requires an access-control-lists on a per-entity basis) and not having enough control (for example, wherein access to each entity within a scope is controlled by the same access-control-lists).

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A computer controlled method comprising:
   maintaining, by a computer, a plurality of sensitivity-entities, wherein a first sensitivity-entity among the plurality of sensitivity-entities is associated with one or more protected-entities, and wherein the first sensitivity-entity comprises a first sensitivity-access-control-list and a local-access-control-list, wherein the sensitivity-access-control-list controls access to the associated protected-entities and the local-access-control-list controls access to the first sensitivity-entity;
   receiving, at the computer, a request from a user to access a first protected-entity in the associated protected-entities;
   determining the user's access rights to said first protected-entity based on the first sensitivity-access-control-list; and
   responsive to the first sensitivity-access-control-list indicating that the user has rights to access the requested first protected-entity, granting, by the computer, the user the access to said first protected-entity.

2. The computer controlled method of claim 1, wherein each of said plurality of entities is associated with a respective local-access-control-list, and said first protected-entity is associated with a first local-access-control-list, the method further comprising evaluating rights to said first protected-entity with respect to said first local-access-control-list.

3. The computer controlled method of claim 1, wherein each of said plurality of entities is associated with a respective local-access-control-list, said first protected-entity is associated with a first local-access-control-list, and said first sensitivity-access-control-list includes a sensitivity-only flag; and the method further comprises evaluating rights to said first protected-entity with respect to said first local-access-control-list responsive to said sensitivity-only flag.

4. The computer controlled method of claim 1, wherein the plurality of entities includes a second entity, the method further comprising associating said first sensitivity-entity with said second entity such that said second entity is converted into a second protected-entity and whereby said first protected-entity and said second protected-entity are protected by said first sensitivity-entity.

5. The computer controlled method of claim 4, wherein said second protected-entity is a copy of said first protected-entity.

6. The computer controlled method of claim 4, wherein said second protected-entity is a proxy for said first protected-entity.

7. The computer controlled method of claim 1, wherein the plurality of entities includes a second entity and a second sensitivity-entity, the method further comprising associating said second sensitivity-entity with said second entity such that said second entity is converted into a second protected-entity and protected by said second sensitivity-entity.

8. The computer controlled method of claim 7, wherein said second protected-entity is one of said plurality of sensitivity-entities.

9. The computer controlled method of claim 7, further comprising creating said second entity within a scope and said second sensitivity-entity is, or is configured in accordance with, a default sensitivity-entity associated with said scope.

10. The computer controlled method of claim 1, wherein said first sensitivity-entity includes a sensitivity name, the method further comprising:
receiving said first protected-entity;
selecting a second sensitivity-entity compatible with said sensitivity name; and
associating said second sensitivity-entity with said first protected-entity.

11. The computer controlled method of claim 1, wherein said first protected-entity is a principal and the method further comprises delegating, by a delegated-by actor, said principal to a delegated-to actor.

12. The computer controlled method of claim 11, wherein said delegated-by actor is a resource.

13. The computer controlled method of claim 1, wherein the evaluating rights comprises: determining an owner right of an actor; and
evaluating rights to said first protected-entity responsive to said first sensitivity-access-control-list and said owner right.

14. The computer controlled method of claim 13, wherein each of said plurality of entities is associated with a respective local-access-control-list, and said first protected-entity is associated with a first local-access-control-list, and wherein the evaluating rights also evaluates responsive to said first local-access-control-list.

15. The computer controlled method of claim 13, wherein the evaluating rights also evaluates responsive to whether said first sensitivity-entity is by-delegation only.

16. An apparatus having a central processing unit comprising:
a storage logic configured to store a plurality of sensitivity-entities, wherein a first sensitivity-entity among the plurality of sensitivity-entities is associated with one or more protected-entities, and wherein the first sensitivity-entity comprises a first sensitivity-access-control-list and a local-access-control-list, wherein the sensitivity-access-control-list controls access to the associated protected-entities and the local-access-control-list controls access to the first sensitivity-entity;
a receiving log configured to receive a request from a user to access a first protected-entity in the associated protected entities;
a sensitivity determination logic configured to determine the user's rights to said first protected-entity based on the first sensitivity-access-control-list in the storage logic; and
an enablement logic configured to grant the user the access to said first protected-entity responsive to the first sensitivity-access-control-list indicating that the user has rights to access the requested first protected entity.

17. The apparatus of claim 16, wherein each of said plurality of entities is associated with a respective local-access-control-list, and said first protected-entity is associated with a first local-access-control-list, the apparatus further comprising a first permission logic configured to evaluate rights to said first protected-entity with respect to said first local-access-control-list.

18. The apparatus of claim 16, wherein each of said plurality of entities is associated with a respective local-access-control-list, said first protected-entity is associated with a first local-access-control-list, and said first sensitivity-access-control-list includes a sensitivity-only flag; the apparatus further comprising a local rights evaluation logic configured to evaluate rights to said first protected-entity with respect to said first local-access-control-list responsive to said sensitivity-only flag.

19. The apparatus of claim 16, wherein the plurality of entities includes a second entity, the apparatus further comprising a protection logic configured to associate said first sensitivity-entity with said second entity such that said second entity is converted into a second protected-entity and whereby said first protected-entity and said second protected-entity are protected by said first sensitivity-entity.

20. The apparatus of claim 19, wherein said second protected-entity is a proxy for said first protected-entity.

21. The apparatus of claim 16, wherein the plurality of entities includes a second entity and a second sensitivity-entity, the apparatus further comprising a protection logic configured to associate said second sensitivity-entity with said second entity such that said second entity is converted into a second protected-entity and protected by said second sensitivity-entity.

22. The apparatus of claim 21, further comprising an entity creation logic configured to create said second entity within a scope in accordance with a default sensitivity-entity associated with said scope.

23. The apparatus of claim 16, wherein said first sensitivity-entity includes a sensitivity name, said apparatus further comprising:
a receiver logic configured to receive said first protected-entity;
a selection logic configured to select a second sensitivity-entity compatible with said sensitivity name received by the receiver logic; and
a re-association logic configured to associate said second sensitivity-entity selected by the selection logic with said first protected-entity.

24. The apparatus of claim 16, wherein said first protected-entity is a principal and said apparatus further comprises a delegation logic configured to delegate said principal, owned by a delegated-by actor, to a delegated-to actor.

25. A non-transitory computer storage medium comprising instructions that, when executed by a computer, cause said computer to perform a method, the method comprising:
maintaining a plurality of sensitivity-entities, wherein a first sensitivity-entity among the plurality of sensitivity-entities is associated with one or more protected-entities, and wherein the first sensitivity-entity comprises a first sensitivity-access-control-list and a local-access-control-list, wherein the sensitivity-access-control-list controls access to the associated protected-entities and the local-access-control-list controls access to the first sensitivity-entity;
receiving a request from a user to access a first protected-entity in the associated protected-entities;
determining the user's access rights to said first protected-entity based on the first sensitivity-access-control-list; and
responsive to the first sensitivity-access-control-list indicating that the user has rights to access the requested first protected-entity, granting the user the access to said first protected-entity.

* * * * *